United States Patent
Bucknell

(10) Patent No.: US 10,801,625 B2
(45) Date of Patent: Oct. 13, 2020

(54) HIGH-PRESSURE SEALING RING

(71) Applicant: Technofast Industries Pty Ltd., Richlands, Queensland (AU)

(72) Inventor: John Wentworth Bucknell, Indooroopilly (AU)

(73) Assignee: TECHNOFAST INDUSTRIES PTY LTD, Richlands, Queensland (AU)

(*) Notice: Subject to any disclaimer, the term of this patent is extended or adjusted under 35 U.S.C. 154(b) by 339 days.

(21) Appl. No.: 15/829,277

(22) Filed: Dec. 1, 2017

(65) Prior Publication Data
US 2018/0080565 A1 Mar. 22, 2018

Related U.S. Application Data

(63) Continuation of application No. 13/982,789, filed as application No. PCT/AU2012/000088 on Feb. 2, 2012, now abandoned.

(51) Int. Cl.
| | |
|---|---|
| *F16B 31/00* | (2006.01) |
| *F16J 15/48* | (2006.01) |
| *F16J 15/06* | (2006.01) |
| *F16J 15/08* | (2006.01) |
| *F16J 15/10* | (2006.01) |
| *F16B 31/04* | (2006.01) |

(52) U.S. Cl.
CPC ............ *F16J 15/48* (2013.01); *F16B 31/043* (2013.01); *F16J 15/06* (2013.01); *F16J 15/061* (2013.01); *F16J 15/062* (2013.01); *F16J 15/0887* (2013.01); *F16J 15/106* (2013.01)

(58) Field of Classification Search
CPC ...................................... F16B 31/043

USPC .......................... 411/14.5, 916, 917
See application file for complete search history.

(56) References Cited

U.S. PATENT DOCUMENTS

| | | | |
|---|---|---|---|
| 3,218,087 A | 11/1965 | Hallesy | |
| 3,463,044 A * | 8/1969 | Hudgins | F16B 4/002 411/391 |
| 3,920,254 A | 11/1975 | Johnston et al. | |
| 3,955,834 A | 5/1976 | Ahlrot | |
| 4,121,838 A | 10/1978 | Sakamaki | |
| 4,231,578 A | 11/1980 | Traub | |
| 4,262,915 A * | 4/1981 | Williams | F16J 15/32 277/560 |
| 4,306,727 A | 12/1981 | Deane | |

(Continued)

FOREIGN PATENT DOCUMENTS

| | | |
|---|---|---|
| DE | 10 2009 022334 A1 | 12/2010 |
| EP | 1076004 | 2/2001 |

(Continued)

OTHER PUBLICATIONS

Supplementary European Search Report and European Search Opinion issued in connection with corresponding European patent application No. 12742478.6, dated Jan. 9, 2017, 8 pages.

(Continued)

*Primary Examiner* — Flemming Saether
(74) *Attorney, Agent, or Firm* — Duane Morris LLP

(57) ABSTRACT

A high-pressure sealing ring for hydraulic assemblies has a substantially—"L"-shaped body with a leg and foot, where an external heel-portion is designed to provide a "rolling" line of sealing contact with the seat in the cylinder or piston in which it is seated.

18 Claims, 8 Drawing Sheets

(56) References Cited

U.S. PATENT DOCUMENTS

| | | | |
|---|---|---|---|
| 4,566,702 A | 1/1986 | Traub | |
| 5,046,906 A * | 9/1991 | Bucknell | B25B 29/02 |
| | | | 411/432 |
| 5,653,452 A | 8/1997 | Jarvenkyla | |
| 6,494,465 B1 * | 12/2002 | Bucknell | F16J 15/0887 |
| | | | 277/641 |
| 6,763,570 B2 * | 7/2004 | Abbott | B23P 19/067 |
| | | | 29/525.01 |
| 7,252,293 B2 | 8/2007 | Happel | |
| 7,341,258 B2 * | 3/2008 | Holt | F16J 15/166 |
| | | | 277/584 |
| 7,563,050 B2 | 7/2009 | Strait | |
| 7,866,669 B2 | 1/2011 | Kobayashi | |
| 8,371,585 B2 | 2/2013 | Esser | |
| 8,556,557 B2 * | 10/2013 | Britton | F16B 33/004 |
| | | | 277/647 |
| 8,714,556 B2 | 5/2014 | Pinto | |
| 9,816,614 B2 * | 11/2017 | Bucknell | B25B 29/02 |
| 9,879,706 B2 * | 1/2018 | Bucknell | F16L 23/036 |
| 2004/0262845 A1 | 12/2004 | Matsui | |
| 2006/0012133 A1 | 1/2006 | Strait | |
| 2006/0119047 A1 | 6/2006 | Riley | |
| 2009/0258715 A1 | 10/2009 | Rode | |
| 2011/0233925 A1 | 9/2011 | Pina | |

FOREIGN PATENT DOCUMENTS

| | | |
|---|---|---|
| FR | 2890717 | 3/2007 |
| GB | 648 434 A | 1/1951 |

OTHER PUBLICATIONS

PCT/AU2012/000088 International Search Report.

* cited by examiner

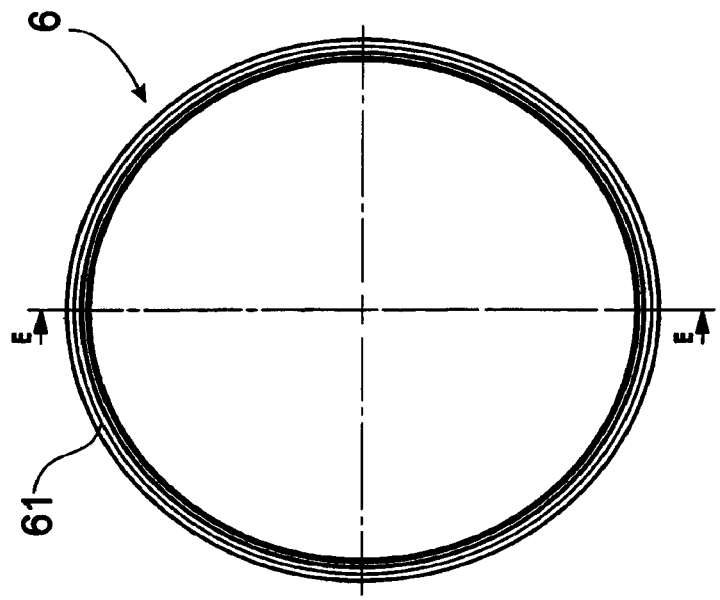
FIG. 3
FIG. 4
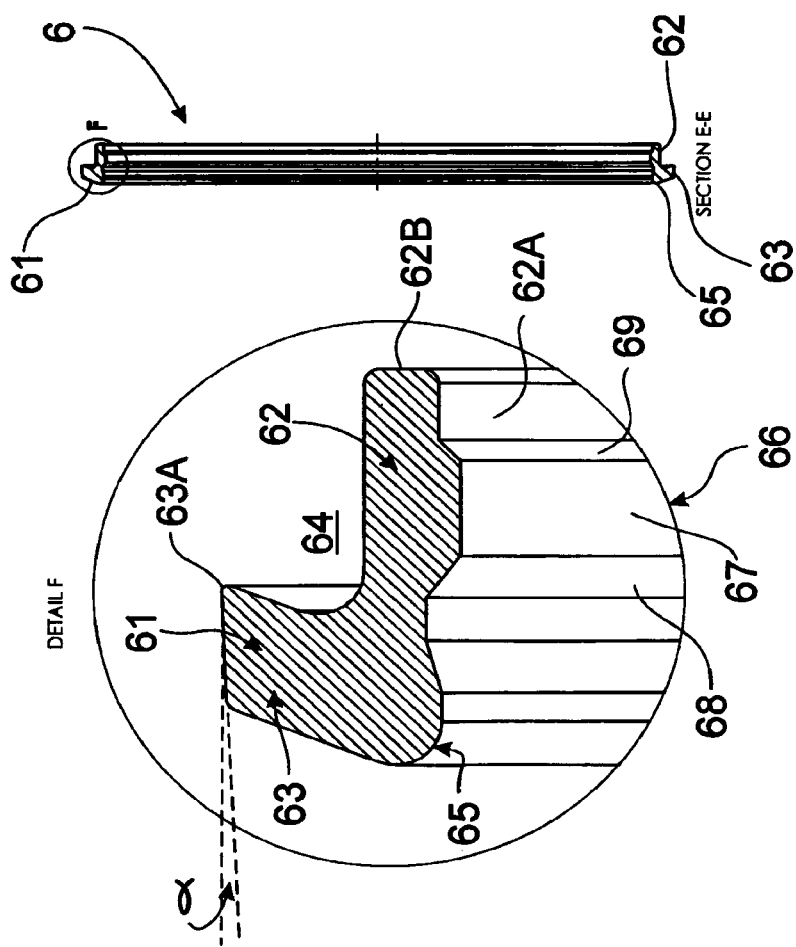
FIG. 5

HIGH-PRESSURE SEALING RING

CROSS-REFERENCE TO RELATED PATENT APPLICATIONS

This application is a continuation of U.S. patent application Ser. No. 13/982,789, filed Oct. 14, 2013, which is a U.S. national stage application under 35 U.S.C. § 371 of PCT Application No. PCT/AU2012/000088, filed Feb. 2, 2012, the entireties of which are incorporated herein by reference.

BACKGROUND OF THE INVENTION

1. Field of the Invention

This invention relates to a high-pressure sealing ring.

The invention particularly relates, but is not limited to, a high-pressure sealing ring suitable for use in seals for hydraulic assemblies. The invention can have particular application in hydraulic assemblies (such as hydraulic tensioning jacks or nuts) operating at high pressures and/or temperatures.

The hydraulic assemblies which may employ the sealing ring included those used in the nuclear, electricity-generating, steam-generating and marine installations.

2. Prior Art

The failure of the sealing rings forming the seals in high-pressure and/or high-temperature hydraulic assemblies is likely to have catastrophic consequences, including the release of radioactive materials, super-heated steam, hazardous liquids or gases (including acids and alkalis), other fluids (including oils and other petrochemical-based products); and/or may result in the mechanical failure of machinery.

FIGS. 2A to 2Q of International Publication WO 2005/080837 (=International Patent Application PCT/AU2005/000253) (Bucknell, John Wentworth), and the accompany description, disclosed a number of alternative profiles for sealing rings in hydraulic assemblies, including the use of the sealing rings in hydraulic fasteners and nuts.

U.S. Pat. No. 6,494,465 (Bucknell) (=International Publication WO 98/00660=International Patent Application PCT/AU97/00425) further discloses earlier sealing rings suitable for high-pressure and/or high-temperature Applications.

Problems with the existing sealing rings referred to above include:
a) the requirement for difficult and precise assembly procedures, including selective heating and/or cooling of the pistons and/or cylinders to enable the installation of the sealing rings;
b) the requirement for insertion rings, interposed between the sealing rings and the insertion tools (e.g. a press)—where the insertion rings may lie in, and extend above, recesses in the upper faces of the sealing rings and which are left in situ; and/or
c) the requirement for complete replacement of the sealing rings, due to failure to achieve acceptable resealing between the (pre-used) sealing rings and the cylinder walls if attempted after disassembly and reassembly e.g. for maintenance or repair.

SUMMARY OF THE INVENTION

It is an object of the present invention to provide a sealing ring which ameliorates, or at least, minimises the problems of the Prior Art sealing rings.

Other preferred objects of the present invention will become apparent from the following description.

In a broad aspect, the present invention resides in a sealing ring for use in a hydraulic assembly of the type having a piston slidably received in a cylinder, the sealing ring including:
an annular ring body of "substantially L" cross-section, with a leg portion and a foot portion interconnected by an external heel having a curved profile.

Preferably, the external heel has a convex profile to form a "rolling" line of sealing contact with a seat in a cylinder or piston to which the ring body is installed.

In one preferred embodiment, the leg has a sealing protrusion intermediate an outer sealing face of the leg, the sealing protrusion having a cylindrical sealing face interposed between a pair of inclined ramp faces, the sealing protrusion and a distal portion of the outer sealing face forming two lines of sealing contact between the ring body and an adjacent cylinder or piston to which the ring body is installed.

Preferably, the foot has a toe portion with a relief angle $\alpha$ in the range of 1° to 5° relative to the central axis of the ring body.

Preferably, the sealing ring has a protrusion on an outer sealing face of the leg, or the external heel is, receivable in a recess in an adjacent cylinder or piston to cause the sealing ring to be "locked" in position.

BRIEF DESCRIPTION OF THE DRAWINGS

To enable the invention to be fully understood, preferred embodiments will be described with reference to the accompanying drawings, in which:

FIG. 3 is a top plan view of the outer sealing ring in FIG. 2;

FIG. 4 is a sectional side view of the sealing ring taken on section E-E on FIG. 3;

FIG. 5 is a view, taken at view F on FIG. 4, of the cross-section of the sealing ring, on an enlarged scale;

NB: Any dimensions and/or annotations on the drawings are by way of illustration only and are not limiting in any way to the scope of the invention.

DETAILED DESCRIPTION OF THE PREFERRED EMBODIMENTS

Figure 1:
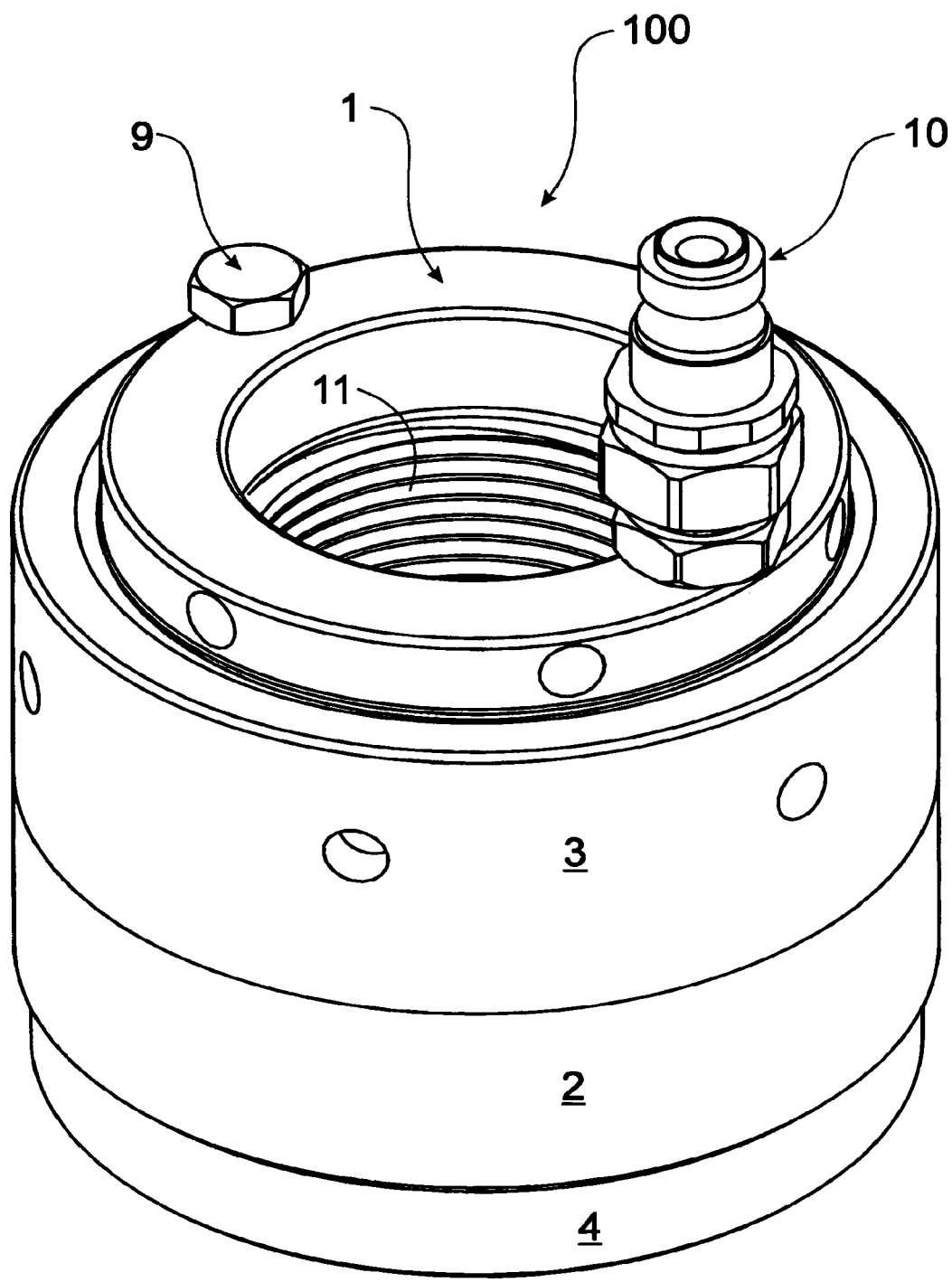
FIG. 1 is an isometric view of a hydraulic nut manufactured and sold by Technofast Industries Pty Ltd, of 2/677 Boundary Road, Richlands, Queensland 4077, Australia under the "TECHNOFAST" and "EziTite" Registered Trade Marks.
Figure 2:
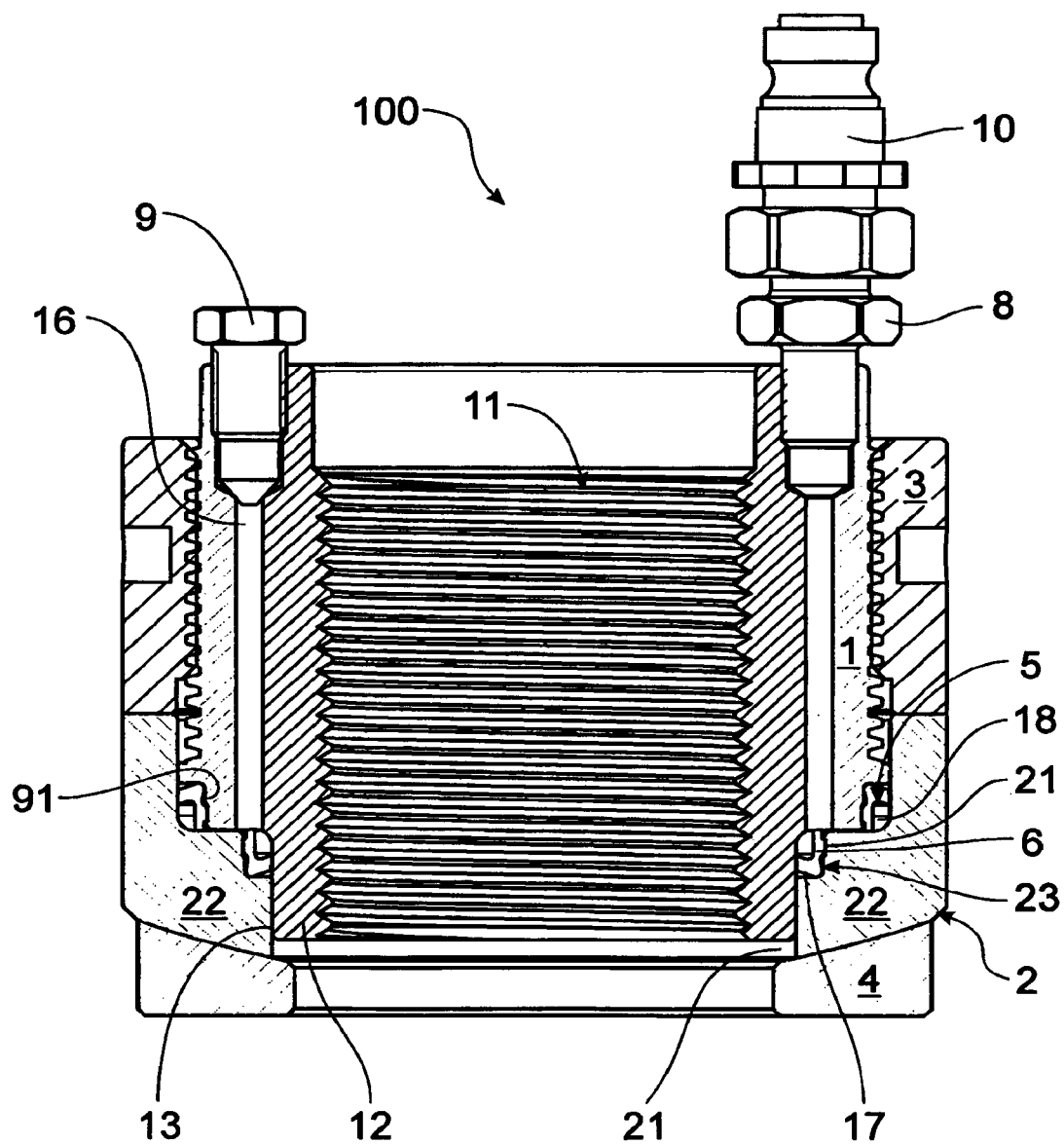
FIG. 2 is a sectional side view of the hydraulic nut of FIG. 1 fitted with sealing rings in accordance with a first embodiment of the present invention.

Referring to FIGS. 1 and 2, the hydraulic nut 10 is designed for high-pressure and/or high-temperature applications, including the securing of steam and gas turbines and other nuclear or fossil fuelled power generation plant.

The hydraulic nut 100 has a tubular hydraulic nut body 1 having a screw-threaded bore 11 therethrough for releasable engagement with a bolt, nut or threaded component (not shown) to be tensioned. An annular extension 12 forms the cylinder wall 13 slidably received in the inner annular bore 21 of the body 22 of the piston 2.

The piston 2 is seated in a spherical washer 4 which bears against an adjacent component (not shown) to be secured by the tensioned bolt, nut or threaded component.

An optional sacrificial ring (not shown) may be interposed between the body 22 of the piston 2 and the screw-threaded tubular body 31 of the lock ring 3 which is engaged with external screw-threads 14 about the nut body 1.

A nipple adaptor 8 and closure plug 9 are mounted on the external annular face 15 of the nut body 1 and are connected to ports 16 in the nut body 1, which in turn are connected to the inner annular cavity 17 defined by the annular extension 12 in the nut body 1 and the inner annular bore 21 of the piston 2. A nipple 10 in the nipple adaptor 8 connects the hydraulic nut 100 to a source of high-pressure hydraulic fluid (not shown).

Outer and inner sealing rings 5, 6, in accordance with the present invention, are located in the inner annular cavity 17, and the outer annular cavity 18 (defined by a cylindrical wall 19 about the nut body 1 and the outer annular bore 23 of the piston 2), respectively. It will be noted that a circumferential flange 19A about the nut body 1 retains the outer sealing ring 5 in the outer annular cavity 18.

As the outer and inner sealing rings 5, 6 have the same sectional configuration, the detailed description thereof, with reference to FIGS. 3 to 5, will be with respect to the inner sealing ring 6.

Referring now to FIGS. 3 to 5, the inner sealing ring 6 is of annular configuration, having an annular body 61 in plan view, as illustrated in FIG. 3.

The ring body 61 is of "modified-L" cross-section, as illustrated in FIGS. 4 and 5.

The ring body 61 has a "leg" 62 and a "foot" 63 with a "valley" 64 on the inner side of the connection therebetween.

The foot 63 has a "toe" 63A in sealing engagement with the cylindrical wall 13 of the annular extension 12 on the nut body 1. The "toe" 63A on the foot 63 has a relief angle α of e.g. 1°-5° from the central axis of the sealing ring 6—see FIG. 5

A curved i.e. convex "heel" 65, externally on the ring body 61, interconnects the leg 62 and the foot 63.

The external outer sealing face 62A of the leg 62 has an optional secondary sealing protrusion 66 with a (substantially cylindrical) sealing face 67 intermediate inclined ramp faces 68, 69.

In use, the convex heel 65 allows the sealing ring body 61 to "roll" on the support surface at the corner of the inner annular bore 21 in the piston 2 so that the distal portion of the outer sealing face 62A of the leg 62 can be deflected into sealing contact with the cylindrical side wall of the inner annular bore.

In addition, the cylindrical sealing face 67 of the sealing protrusion 66 is also urged into sealing contact with the wall of the inner annular bore 21 in piston 2, so that there are two (2) lines of sealing engagement between the leg 62 of the sealing ring body 61 and the inner annular bore 21 in the piston 2.

The annular end face 62B on the leg 62 can be engaged by the corresponding abutting face of each component (eg FIG. 2, 22 or 1) enable the sealing ring 6 to be fitted in the inner annular bore in piston 2 without the requirement for an insertion ring, as the engagement between the annular end face 62B, and the insertion tool will not adversely effect the sealing engagement between the leg 62 and the inner annular bore 21.

As stated above, the curved heel 65 provides a line of "rolling-contact" between the ring body 61 and the corner of the annular inner bore 21 which enables the leg 62 to move into, or out of, sealing contact with the piston 2 as the hydraulic pressure in annular cavity 17 is increased, or decreased, respectively. This ensures that when the hydraulic pressure is increased after the initial increase/decrease cycle, the leg 62 (and sealing protrusion 66) can again make effective sealing contact with the inner annular bore 21 in the piston 2.

The selection of the material(s) for the manufacture of the sealing ring 6, and the dimensions and/or configurations of the respective portions of the sealing ring body 61, will be selected to suit the particular intended application of the hydraulic assembly to which the sealing ring 6 is the be fitted.

As illustrated in FIG. 2, two or more of the sealing rings 5, 6 may be fitted to a single hydraulic assembly, such as the hydraulic nut 100.

Figure 6:
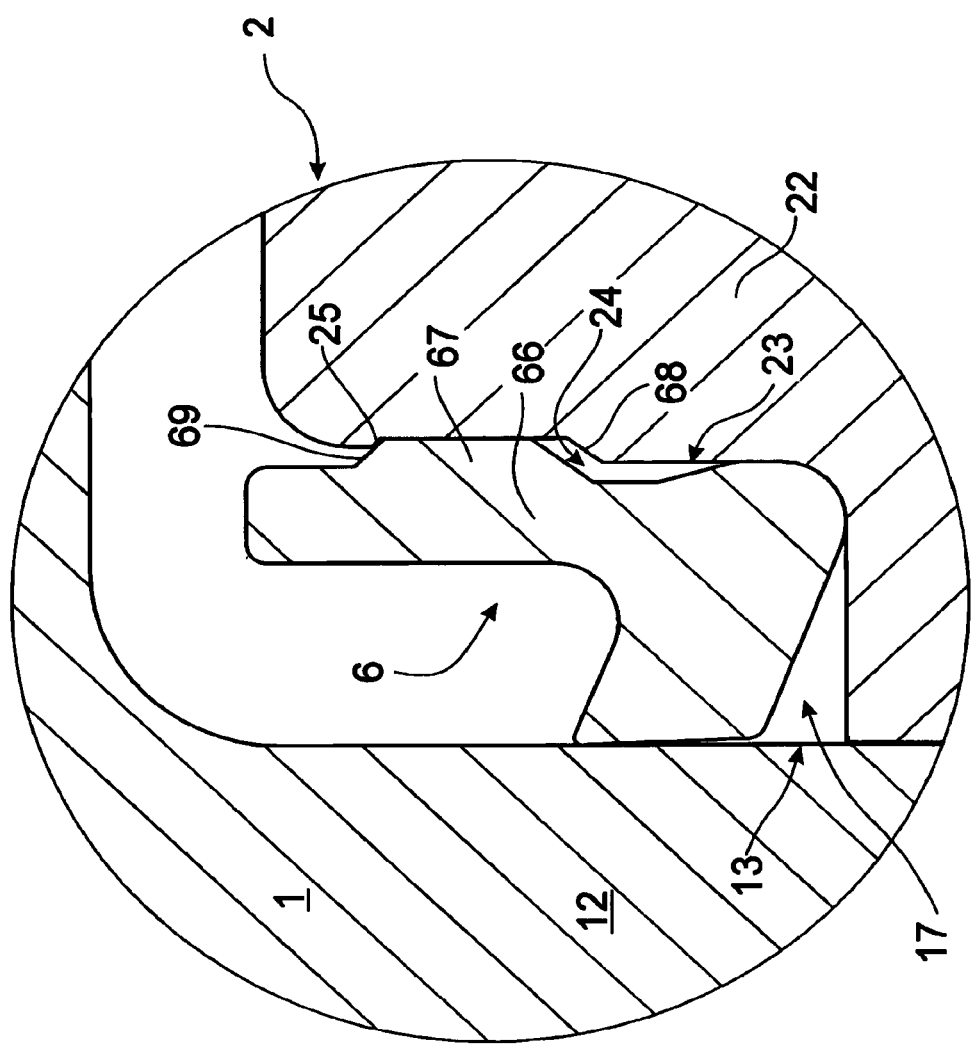
FIG. 6 is a sectional side view, on an enlarged scale, of the inner sealing ring and of the associated cylinder and piston of FIG. 2.

As illustrated in enlarged scale in FIG. 6, the secondary sealing protrusion 66 may be received within a recess 24 in the outer annular bore 23 of the piston 2. The recess 24 has an inclined abutment face 25 which is engageable by the upper ramp face 69 on the secondary sealing protrusion 656 to "lock", or at least locate, the sealing ring 6 relative to the piston 2. (The contact between the secondary sealing protrusion 66 and the recess 24 also increases the area of sealing contact between the sealing ring 6 and piston 2.)

Figure 7:
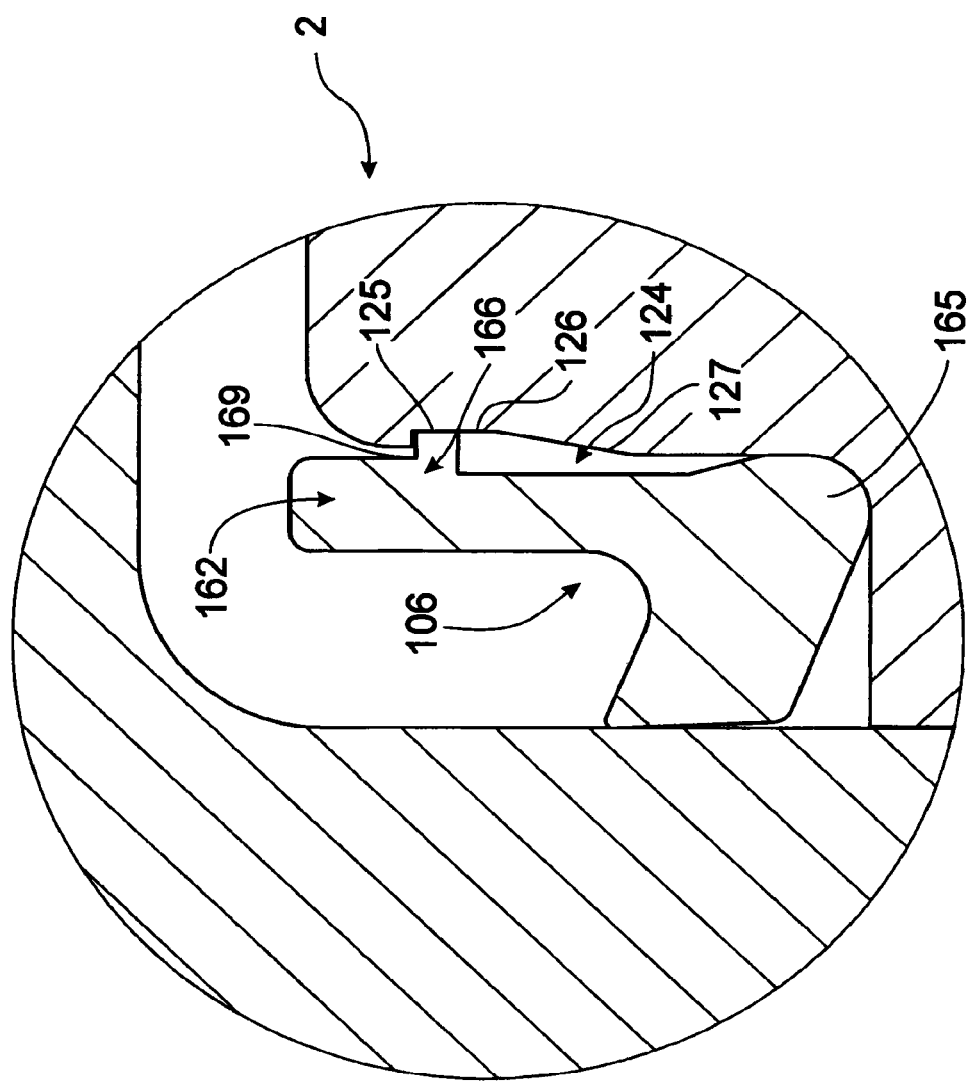
FIG. 7 is sectional side view, similar to FIG. 6, of a sealing ring of a second embodiment of the present invention and of the associated cylinder and piston.

FIG. 7 illustrates a second embodiment of the sealing ring 106, where the secondary sealing protrusion 166 is provided in the form of an external circumferential flange about the leg 162; and the upper face 169 of the secondary sealing protrusion can engage, and be restrained by, a complementary abutment face 125 of recess 124 in the piston 102. The abutment face 125 extends perpendicular to a cylindrically floor 126 of the recess 124, the floor 126 being connected to a lower ramp face 127.

Figure 8:
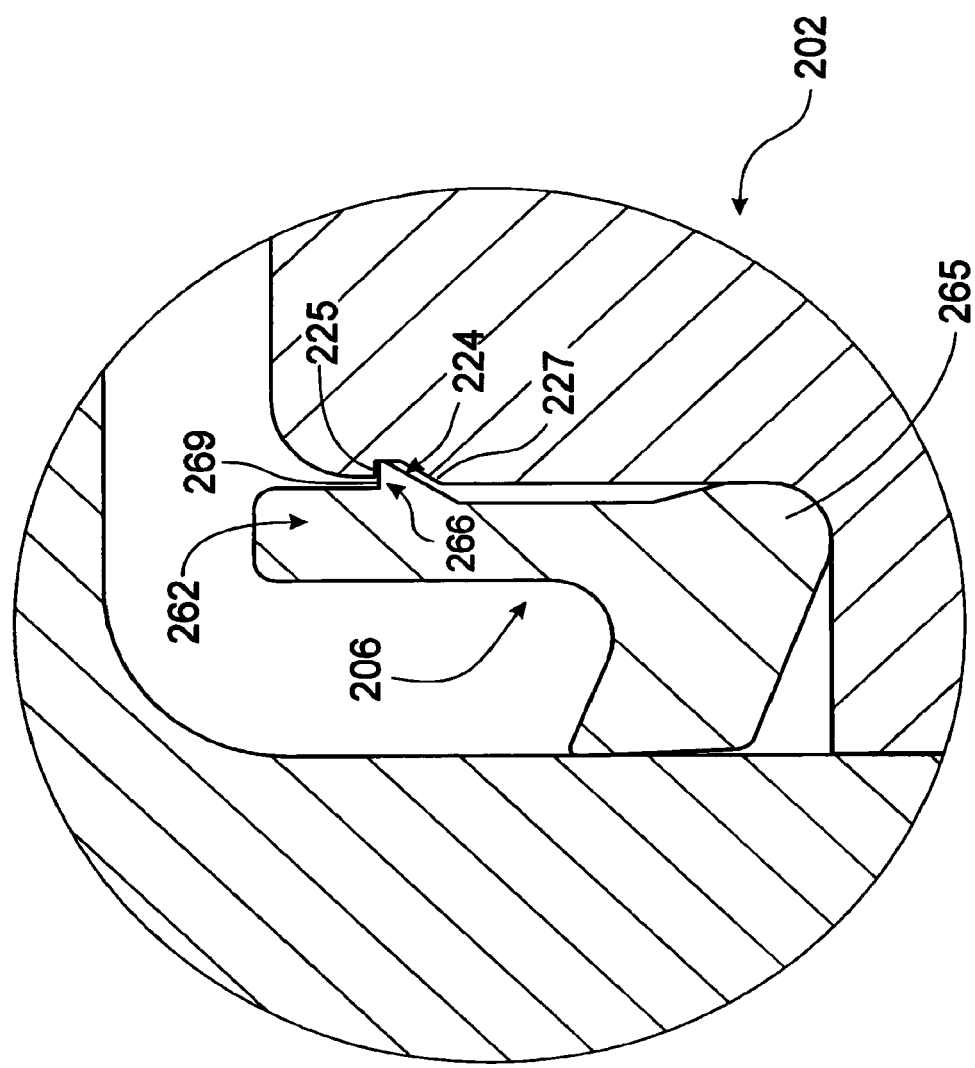
FIG. 8 is a similar view of a sealing ring of a third embodiment of the present invention and of the associated cylinder and piston.

In the third embodiment illustrated in FIG. 8, the recess 224 is of reduced height relative to recess 124; and the secondary sealing protrusion 266 has an upper face 269 engageable with an abutment face 225 similar to the abutment face 125 of the recess 124. The secondary sealing protrusion has the profile of a right-angle triangle.

In both the second and third embodiments, the distal portions of the legs 162, 262 of the sealing rings 106, 206 are of thicker cross-section than the portions intermediate the secondary sealing portions 166, 266 and the heel portions 165, 265 during assembly procedures.

Figure 9:
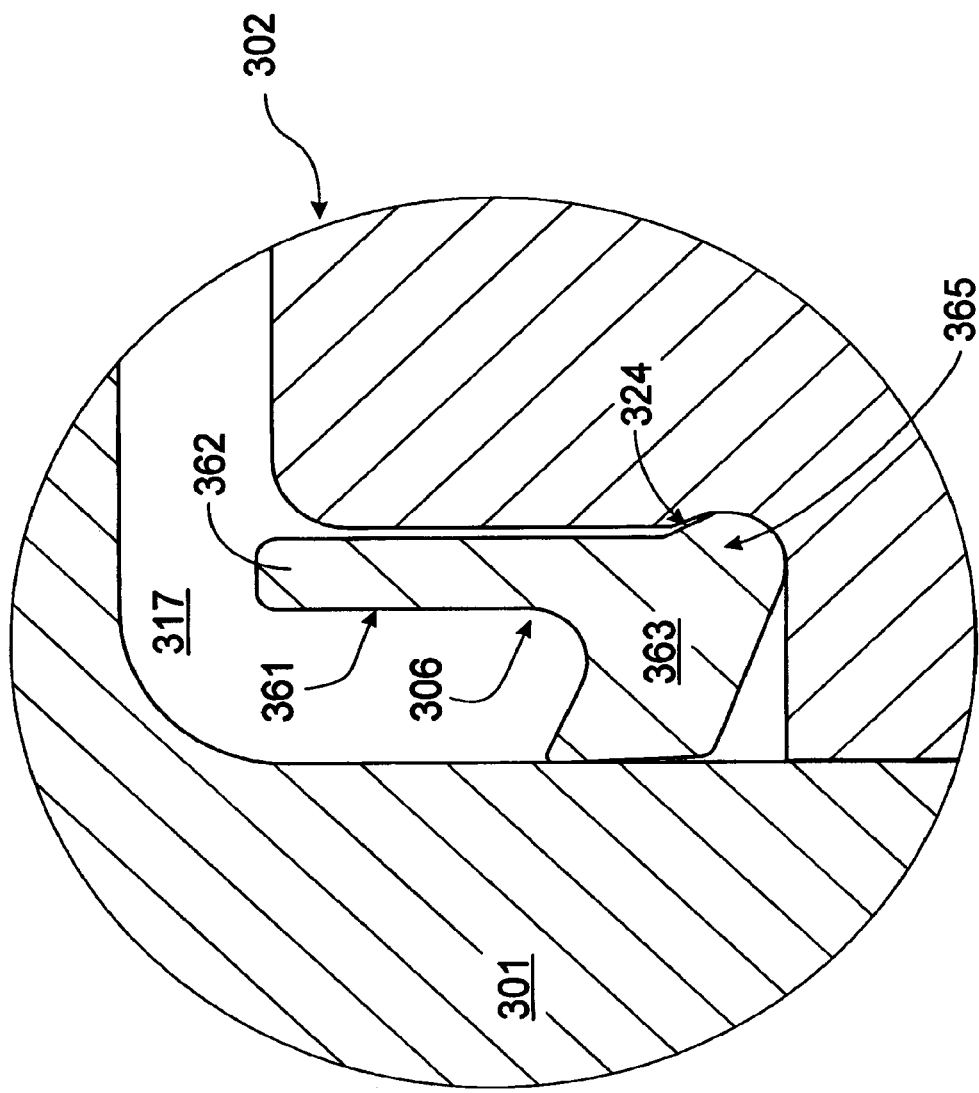
FIG. 9 is a similar view of a sealing ring of a fourth embodiment of the invention and of the associated cylinder and piston.
Figure 11:
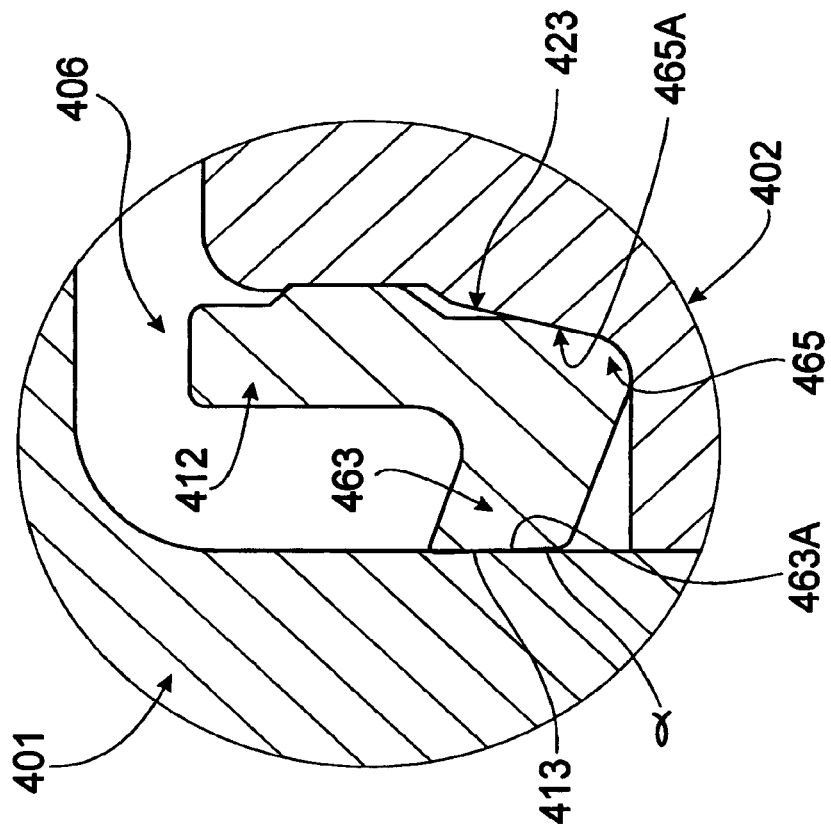
FIG. 11 is an enlarged view of one of the sealing rings of FIG. 10.

FIG. 9 illustrates a fourth embodiment of the sealing ring 306, where the secondary sealing protrusion is omitted from the leg 362, but where the heel portion 365 is received in a recess 324 to locate and restrain the sealing ring 306 in the piston 302.

The skilled addressee will appreciate the location of the heel portion 365 in the recess 324 will still enable the line of "rolling-contact" to be maintained between the ring body 361 and the recess 324 of the piston 302; and the foot 363 remains in sealing contact with the nut body 301; whether or not the leg 362 moves into, or out of, sealing contact with the piston 302; as the hydraulic pressure on the annular cavity 317 is increased, or decreased.

Figure 10:
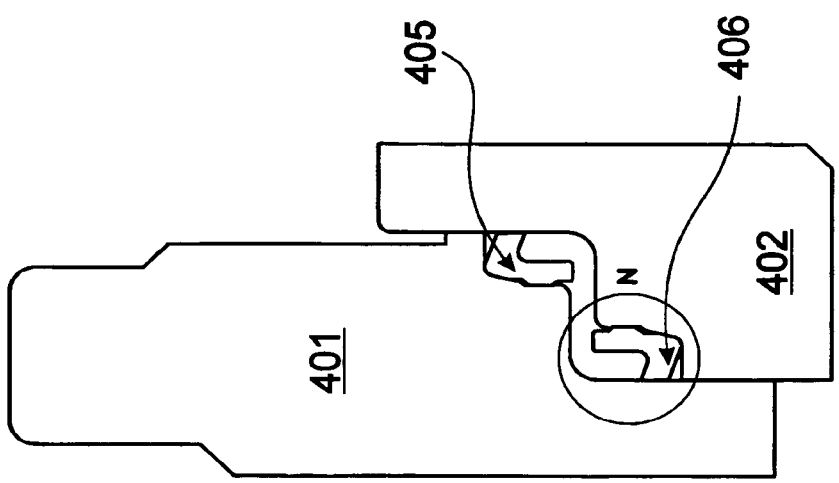
FIG. 10 is a sectional side view of a modified version of the hydraulic nut fitted with a pair of sealing rings of a fifth embodiment of the present invention.

FIG. 10 and illustrate sealing rings 405, 406 of a fifth embodiment, which are closely related to the sealing rings 6 of the first embodiment—with particular reference to FIG. 6.

The sealing ring 406 has a ring body 461 with a leg 462 and foot 463. The toe 463A has a relief angle α of e.g. 1°-3° relative to the adjacent wall 413 of the nut body 401.

The annular bore 423 of the piston 402 is inwardly tapered in a downwards direction, and the portion 465A of the ring body 461 has a corresponding "taper" down to the curved heel 465.

As the heel 465 rolls as the hydraulic pressure is increased, the toe 463A moves towards full contact with the wall 413 to increase the sealing there-between. This corresponding "taper" allows the seal to be automatically preloaded by the action of pressing components (eg FIGS. 2; 1 and 22) together, eliminating the need for heating/cooling and introductory tapers on sliding contact faces.

As hereinbefore discussed with respect to the PRIOR ART, previous designs proposed a two part sealing mechanism. The first sealing mechanism was created by the action of the lips of the seal acting against both static and sliding contacts of the seal retaining groove. The second sealing mechanism was then generated by the ability of the seal body to slide to fill and seal the 'seal extrusion gap' created as the cylinder wall moved radially outwards in response to increasing hydraulic pressure in the sealed The sealing rings of the present invention produce an initial sealing action from the action of spring force generated by slight elastic bending of the sealing ring as it is inserted into place. This bending forces the 'heel' of the sealing ring into its respective seat and the 'sealing edge' (of the toe) against the cylinder wall. As hydraulic pressure is increased in the sealed chamber, the sealing mechanism will be further enhanced by increasing inner and outer radial thrust generated as the sealing ring flexes and rolls on its 'heel' to follow outward radial movement of the cylinder wall. The alternative designs of the embodiments described and illustrated predict and allow a degree of bending of the seal body to continually align the 'sealing edge' (of the toe) against the cylinder wall.

As illustrated in the embodiment of FIG. 6, sealing of the (leg of the) sealing ring to the 'seal carrier' side of the seal retaining groove can be made in the upper portion (or the leg) of the "L" shape of the seal.

In addition, mechanisms to physically retain the sealing ring can be incorporated as illustrated in FIGS. 7 to 9. These mechanisms can also combine a sealing function in the upper portion (or the leg) of the "L" shape of the sealing ring, together with the mechanical location function.

The skilled addressee will appreciate the following additional advantages of the sealing rings of the present invention:

A) The shape of sealing ring enables easy insertion, to thereby obviate the need for complex assembly procedures.

B) It is not necessary to have a permanently installed, but loose, insertion ring rattling about inside the hydraulic nut or other hydraulic assembly—the insertion ring is an integral part of this seal construction.

C) The method of sealing as related to shape of sealing ring. The sealing ring is 'preloaded' for use simply by insertion into place. Sealing is then maintained and improved by predicted and controlled flexing of the sealing ring in response to the hydraulic charge pressure.

D) The reusability of the sealing ring as a function of the design. No part of the sealing ring is overstressed during operation. Therefore, it can be cleaned and reassembled.

Various changes and modifications may be made to the embodiments described and illustrated without departing from the present invention.

The invention claimed is:

1. A hydraulic nut assembly, comprising:
a piston;
a cylinder slidably received in the piston; and
a sealing ring formed from a monolithic material located in a cavity between the cylinder and the piston, the sealing ring including an annular ring body of substantially "L"-shaped cross-section, with a leg portion and a foot portion interconnected by an external heel having a curved profile, wherein the foot portion has a toe portion with a relief angle in the range of 1° to 5° relative to a central axis of the ring body.

2. The hydraulic nut assembly as claimed in claim 1, wherein the toe portion of the sealing ring engages a wall portion of the piston or cylinder associated with the cylinder or piston, respectively, in which the sealing ring is installed, whereby the toe portion is moved towards full sealing contact with the wall portion as the heel rolls relative to the piston or cylinder as hydraulic pressure between the cylinder and piston is increased and the cylinder expands in diameter.

3. The hydraulic nut assembly as claimed in claim 1, wherein the sealing ring has a protrusion on an outer sealing surface of the leg, or the external heel, receivable in a recess in the cylinder or piston.

4. The hydraulic nut assembly as claimed in claim 3, wherein the protrusion is in the form of a circumferential flange about the leg portion.

5. The hydraulic nut assembly as claimed in claim 4, wherein a face of the circumferential flange engages a complementary abutment face of the recess in the cylinder or piston.

6. The hydraulic nut assembly as claimed in claim 1, the hydraulic nut assembly further comprising a spherical washer, wherein the piston is seated in the spherical washer.

7. The hydraulic nut assembly as claimed in claim 1, wherein the cylinder is slidably received in an inner annular bore of the piston.

8. The hydraulic nut assembly as claimed in claim 1, wherein the cylinder comprises a tubular hydraulic nut and an annular extension.

9. The hydraulic nut assembly as claimed in claim 8, wherein the tubular hydraulic nut comprises a screw-threaded bore therethrough.

10. The hydraulic nut assembly as claimed in claim 8, wherein the annular extension forms a cylinder wall slidably received in the inner annular bore of the piston.

11. The hydraulic nut assembly as claimed in claim 8, the hydraulic nut assembly further comprising a nipple adaptor mounted to the tubular hydraulic nut.

12. The hydraulic nut assembly as claimed in claim 11, wherein the nipple adaptor comprises a nipple for connecting the hydraulic nut assembly to a source of high-pressure hydraulic fluid.

13. The hydraulic nut assembly as claimed in claim 8, the hydraulic nut assembly further comprising a closure plug mounted to the tubular hydraulic nut.

14. The hydraulic nut assembly as claimed in claim 13, wherein the closure plug and the nipple adaptor are connected to ports in the cylinder.

15. The hydraulic nut assembly as claimed in claim 8, wherein the sealing ring is a first sealing ring located in the cavity between the annular extension of the cylinder and the piston.

16. The hydraulic nut assembly as claimed in claim 8, wherein the sealing ring is a first sealing ring located in the cavity between the tubular hydraulic nut of the cylinder and the piston.

17. The hydraulic nut assembly as claimed in claim 16, wherein a circumferential flange about the tubular hydraulic nut retains the first sealing ring in the cavity.

18. The hydraulic nut assembly as claimed in claim 8, wherein the sealing ring is a first sealing ring located in the cavity between the annular extension of the cylinder and the piston, and the hydraulic nut assembly further comprises a second sealing ring located in the cavity between the tubular hydraulic nut of the cylinder and the piston.

\* \* \* \* \*